United States Patent [19]

Sowa

[11] 3,976,540
[45] Aug. 24, 1976

[54] MAGNETIC LATCH TRIGGER FOR INHERENT SHUTDOWN ASSEMBLY

[75] Inventor: Edmund S. Sowa, Lisle, Ill.

[73] Assignee: The United States of America as represented by the United States Energy Research and Development Administration, Washington, D.C.

[22] Filed: Apr. 3, 1975

[21] Appl. No.: 564,926

[52] U.S. Cl. .......................... 176/36 R; 176/DIG. 5
[51] Int. Cl.² ......................................... G21C 7/08
[58] Field of Search .................. 176/22, 36, DIG. 5; 335/217

[56] References Cited
FOREIGN PATENTS OR APPLICATIONS
890,661   3/1962   United Kingdom .................. 176/22

Primary Examiner—Samuel Feinberg
Attorney, Agent, or Firm—Dean E. Carlson; Arthur A. Churm; Paul A. Gottlieb

[57] ABSTRACT

An inherent shutdown assembly for a nuclear reactor is provided. A neutron absorber is held ready to be inserted into the reactor core by a magnetic latch. The latch includes a magnet whose lines of force are linked by a yoke of material whose Curie point is at the critical temperature of the reactor at which the neutron absorber is to be inserted into the reactor core. The yoke is in contact with the core coolant or fissionable material so that when the coolant or the fissionable material increase in temperature above the Curie point the yoke loses its magnetic susceptibility and the magnetic link is broken, thereby causing the absorber to be released into the reactor core.

6 Claims, 3 Drawing Figures

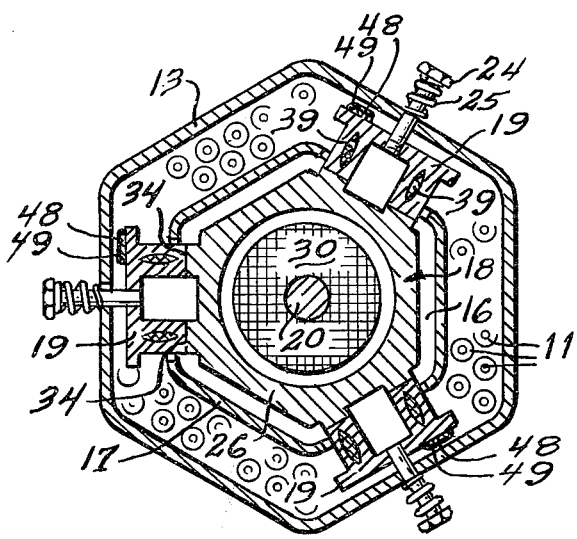
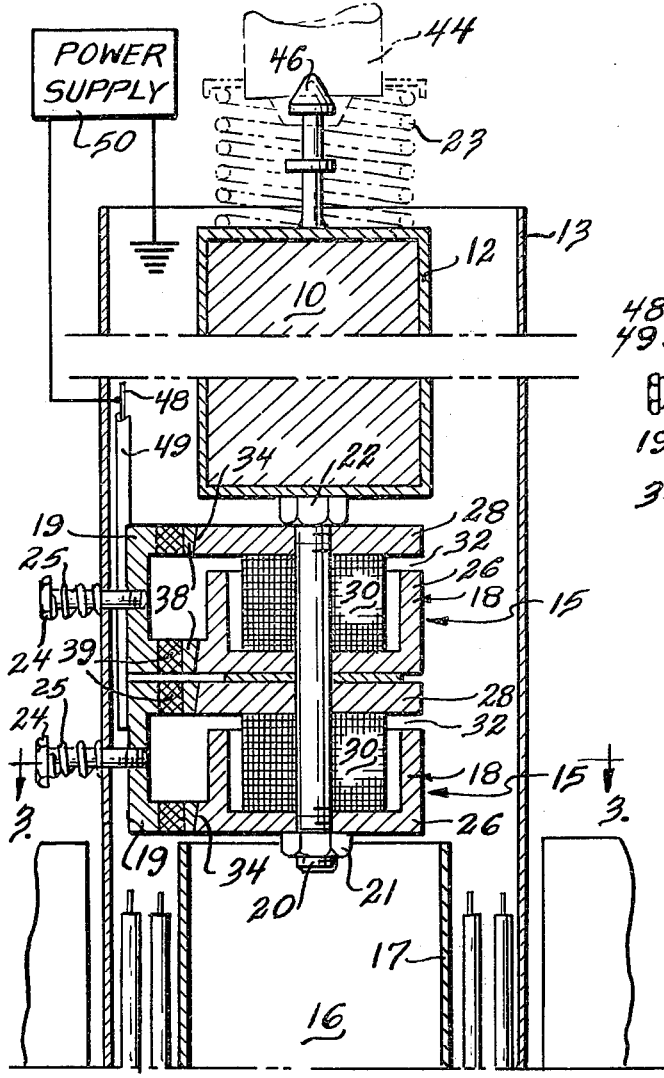
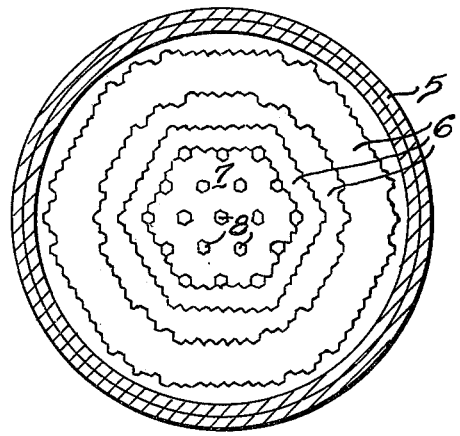
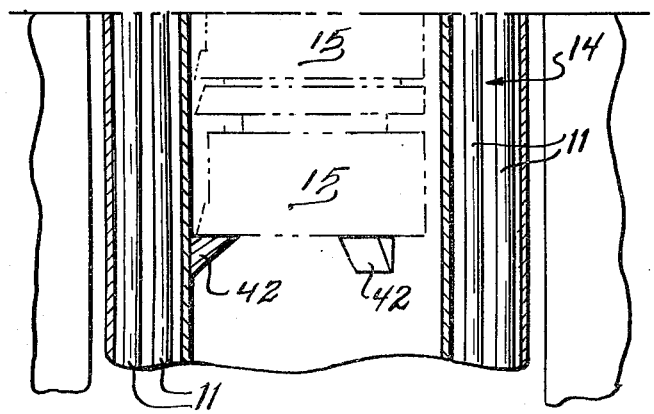

MAGNETIC LATCH TRIGGER FOR INHERENT SHUTDOWN ASSEMBLY

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

In a nuclear reactor, an inherent shutdown assembly includes a mass of nuclear absorber material located above the core material, sufficient to shut down the system and terminate any dangerous transients. When either the neutron flux or the core coolant temperature exceeds some predetermined critical level, a trigger is actuated and this releases a latch permitting the poison mass to be inserted into the core. The poison mass absorbs excess neutrons generated in the core, thereby controlling the dangerous transients.

An inherent shutdown assembly includes means to sense the temperature of the coolant, means to hold the poison in a position ready to be released into the reactor core, and means for releasing the poison into the core when the sensing means indicates that the critical temperature has been reached or that the neutron flux has reached a particular reactivity. Present devices generally suffer from being one-time only devices, i.e. once they have been activated they can't be used again. This prevents in situ testing of such devices. An example of such a device is a poison mass which is restrained by a metal wall whose melting point is at the critical temperature. When the critical temperature is reached, the metal melts and the poison crashes through the melted wall restraint into the reactor core. Since it is a one-time only device, it cannot be tested to see if it is operating properly prior to the actual failure of the reactor. In addition, present device has separate sensing, triggering and release elements which encumber design and operation, requiring in many cases connection, external to the assembly.

It is therefore an object of this invention to provide an inherent shutdown assembly for a nuclear reactor.

Another object of this invention is to provide an inherent shutdown assembly capable of being tested in situ.

SUMMARY OF THE INVENTION

An inherent shutdown assembly for a nuclear reactor includes a magnetic latch which restrains insertion of a neutron absorber into a reactor core, senses when an agent such as the reactor coolant temperature or neutron flux is at a critical level and releases the neutron absorber when the critical level is reached. The absorber is restrained and supported by a magnet whose lines of force are linked by a yoke. The yoke is of a ferromagnetic material having a Curie point at the critical level and in one embodiment is in contact with the core coolant. When the coolant temperature reaches the critical level, the yoke will be at its Curie point and thereby will lose its magnetic susceptibility, releasing the absorber into the core. In another embodiment, the yoke is in contact with fissionable material which is exposed to the neutron flux developed by the reactor. When the reactor power increases, the fissionable material heats up until, at the critical level, the yoke loses its magnetic susceptibility and the absorber is released into the reactor core. When cooled, the yoke regains its magnetic susceptibility, thereby allowing the magnetic latch to be reused and tested in situ by providing means for external heating of the yoke.

BRIEF DESCRIPTION OF THE DRAWINGS

FIG. 1 is a view of a reactor core;

FIG. 2 is a section of the inherent shutdown assembly, and

FIG. 3 is a section along lines 3—3 of FIG. 2.

DETAILED DESCRIPTION

Referring to FIG. 1 there is shown the core region of a nuclear reactor. The region is enclosed within containment vessel 5 and is surrounded by blanket region 6. The core 7 is comprised of a plurality of subassemblies which in the embodiment shown are hexagonal, as is generally the case. The inherent shutdown assembly herein disclosed is designed to be conformable to the geometry of the core subassemblies. Thus, in the embodiment shown, the shutdown assemblies 8 are hexagonal allowing them to be placed intermittently above the core 7 in a position ready to be inserted into core region 7.

Referring to FIG. 2 and FIG. 3 there is shown an inherent shutdown assembly for a nuclear reactor. A neutron absorber or poison mass 10 is contained within a casing 12 and is held in a position above the core region 14 of the reactor. The core region 14, which contains fuel pins 11, is segmented into hexagonal units by wall 13 which also serves as a containment vessel for the core coolant which flows through core region 14. When either the temperature of this coolant or when the neutron flux of reactor reaches a critical level, it is necessary for poison mass 10 to be inserted into the core region 14. The poison mass 10 will then absorb excess neutrons, thereby causing the reactor to shut down. The poison is held in a position separated from core region 14 by a magnetic latch 15. When the critical condition is reached the latch 15 is released and the poison mass 10 will descent by gravity or spring assist 23 into channel 16 within core region 14. Channel 16 is defined by hexagonal support wall 17.

Magnetic latch 15 performs three functions. It holds poison mass 10 in a position above core region 14, it senses when either the coolant flowing within wall 13 has reached a critical temperature or when the neutron flux exceeds a critical level, and it triggers the release of poison mass 10 into channel 16 when either critical condition has been reached. Magnetic latch 15 includes a stack of similar latching components with each component having a magnetic element 18 and a linking yoke 19. In the embodiment shown magnetic elements 18 are hexagonal in shape and are held in a stack and are coupled to casing 12 by bolt 20 and nuts 21 and 22 so that when latch 15 is released the magnetic elements 18 descend into channel 16 with poison mass 10. The yokes 19 are maintained in a stack corresponding to the stack of magnetic elements 18 by bolts 24 and springs 25.

Each magnetic element 18 includes a ferromagnetic link cup 26, a ferromagnetic link lid 28 and a magnet 30. There is a gap 32 between cup 26 and lid 28. Extending from several sides of each cup 26 and each lid 28 are contact surfaces 34. Each yoke 19 is of a ferromagnetic material and has extensions 38 corresponding in number and separation to the contact surfaces 34.

The contact surfaces 34 and extensions 38 facilitate the linking of lines of flux developed by magnet 30. An attractive force thus develops between surfaces 34 and corresponding extensions 38. In the embodiment shown there are three sides of each cup 26 and lid 28 which have contact surfaces 34, there are two magnetic elements 18 and six yokes 19, thereby forming a stack of two latching components. The number of components, the number of sides of magnetic elements 18 having contact surfaces 34, the number of contact surfaces 34 and the number of yokes 19 are chosen according to the amount of weight which is to be supported. In any event, the attraction of the yokes 19 and magnetic elements 18 is what supports poison mass 10 above core region 14.

The Curie point for a ferromagnetic material is that temperature at which the permeability of the material is equal to the permeability of free space. Thus, at the Curie point, ferromagnetic materials change abruptly from being ferromagnetic to being paramagnetic. They no longer can form a magnetic circuit and, if part of such a circuit, they lose their holding power. However, when cooled below their Curie point, they regain their magnetic susceptibility.

When the coolant in wall 13 is at a temperature below the Curie temperature of the ferromagnetic material of yokes 19, the lines of force of the supporting magnet 30 link through cap 26, yoke 19 and lid 28. The material forming the ferromagnetic portion of yoke 19 is chosen so that its Curie point coincides with a desired critical temperature of the coolant at which the poison mass 10 should be inserted into the reactor core. Abnormal increases in reactor power will increase the fission rate and heat up the coolant. This drives the temperature of the ferromagnetic material of yoke 19 rapidly toward its Curie point. When the Curie point is reached, demagnetization of the ferromagnetic material of yoke 19 will break the magnet circuit supporting poison mass 10 and linking will then occur across gap 32. The ferromagnetic material of yoke 19 thus serves as a temperature sensor and at its Curie point triggers release of the poison mass. Of course, the release point does not have to be exactly at the Curie point. When the magnetic permeability decreases with increasing temperature and the B field drops to where the holding power of magnet equals the absorber weight, the absorber will drop.

Sensing of neutron flux can be achieved by incorporating within yoke element 19 fissionable material 39. By being in such close proximity to the core, the resulting neutron flux will cause the fissionable material 39 to heat up to a temperature which is proportional to the neutron flux. This produces rapid local heating of the ferromagnetic portion of yoke 19 adjacent fissionable material 39. When the fissionable material heats up to the Curie point of the ferromagnetic material, the magnet link is broken and the poison mass will be released.

The descent of poison material 10 into channel 16 is unobstructed because when yoke elements 19 is no longer attracted to magnetic elements 18, springs 25 draw yoke elements 19 away from the downward path of poison mass 10. Likewise the contact surfaces 34 and the extensions 38 are tapered with respect to each other to also provide an unobstructed release. Downward progress of the poison mass 10 is limited by stops 42 so that the poison mass 10 will descent to the desired level with respect to core region 14.

Since upon cooling below its Curie point the ferromagnetic portion of yoke element 19 regains its magnetic susceptibility, the magnet latch 15 may be relatched. This may be achieved with manipulator arm 44 which grasps knob 46. Knob 46 is rigidly attached to casing 12 so that the assembly may be lifted out of core region 14 to a position where yokes 19 and magnetic elements 18 are in proper alignment to allow relatching.

This relatching feature also allows in situ testing of the inherent shutdown assembly without damage to any of its constituent parts and without reactor shutdown. This may be done by heating the ferromagnetic portion of yoke elements 19 electronically. Each yoke may be coupled to a wire such as a copper bus bar 48 which is insulated by insulation 49 and is coupled to external power supply 50. Where the coolant is a liquid metal, the power supply may be grounded in the liquid metal. Otherwise, the power supply must be coupled to the ferromagnetic portion of yoke elements 19. This allows resistance heating of each yoke element 19 to the Curie point of its ferromagnetic material. Then, if the latch 15 is working properly, the assembly may be lifted by manipulator arm 44 from its supported position.

Note that the inherent properties of the device allows confinement of the entire mechanism for shutdown activation within the shutdown assembly. In this way, the complete shutdown action depends upon basic properties intrinsic to the shutdown assembly. This eliminates dependence upon external circuitry such as sensors and release triggers which may compromise assembly design and operation.

The embodiments of the invention in which an exclusive property or privilege is claimed are defined as follows:

1. In a nuclear reactor, an inherent shutdown assembly for releasing a neutron absorber into the core region of the reactor with the density of neutron flux of the core region at a critical level, comprising: support means adjacent the core region capable of supporting an object coupled thereto, a neutron absorber, a fissionable material exposed to the neutron flux of the core region so that as the density of said flux varies the temperature of said fissionable material varies proportionally, and a magnetic latch including a magnet and a ferromagnetic link in contact with said fissionable material so that the temperature of said link varies proportionally with the temperature of said fissionable material and thereby with the density of said flux, said latch being coupled to said support means and said absorber so that with the density of neutron flux below the critical level said link is attracted to said magnet to form a completed magnetic circuit of sufficient attractive force between said link and said magnet to couple the absorber to said support means whereby the absorber is held in a position adjacent the core region, and so that with the density of neutron flux at least equal to the critical level the magnetic permeability of said link being of such value that the attractive force between said link and said magnet is insufficient to couple said absorber to said support thereby allowing said absorber to enter said core region.

2. The assembly of claim 1 wherein the reactor core region coolant is in contact with said link so that as the temperature of said coolant increases the temperature of said link increases.

3. The assembly of claim 2 further including a power source, and electrical connections coupling said power source to said link thereby allowing said link to be resistance heated.

4. The assembly of claim 3 further including at least one additional magnetic latch with all said magnetic latches arranged in a stack with said absorber atop said stack.

5. The assembly of claim 4 wherein said shutdown assembly enters the reactor core by descending therein and wherein the reactor core region includes subassemblies of particular shape, and wherein at least one of said subassemblies is adapted to receive said descending shutdown assembly, said one subassembly includes means to stop the descent of said shutdown assembly so that the absorber is positioned in a predetermined manner within the core region.

6. The device of claim 5 further including means for resetting said shutdown assembly so that with said shutdown assembly having descended into the core region said means for resetting is capable of raising said assembly to allow for recoupling of said magnetic latches to said support structure.

* * * * *